US006603427B2

United States Patent
Cai et al.

(10) Patent No.: US 6,603,427 B2
(45) Date of Patent: Aug. 5, 2003

(54) SYSTEM AND METHOD FOR FORMING A BEAM AND CREATING NULLS WITH AN ADAPTIVE ARRAY ANTENNA USING ANTENNA EXCISION AND ORTHOGONAL EIGEN-WEIGHTING

(75) Inventors: Khiem V. Cai, Brea, CA (US); Robert L. Hartman, Redondo Beach, CA (US)

(73) Assignee: Raytheon Company, Lexington, MA (US)

( * ) Notice: Subject to any disclaimer, the term of this patent is extended or adjusted under 35 U.S.C. 154(b) by 70 days.

(21) Appl. No.: 09/892,248

(22) Filed: Jun. 27, 2001

(65) Prior Publication Data

US 2003/0025633 A1 Feb. 6, 2003

(51) Int. Cl.[7] .............................. G01S 3/16; G01S 3/28
(52) U.S. Cl. ........................................ 342/378; 342/382
(58) Field of Search ................................. 342/154, 156, 342/368, 378, 382

(56) References Cited

U.S. PATENT DOCUMENTS

| | | | |
|---|---|---|---|
| 5,271,038 A | | 12/1993 | Cai |
| 5,819,168 A | * | 10/1998 | Golden et al. .............. 455/303 |
| 5,982,327 A | * | 11/1999 | Vook et al. .................. 342/380 |
| 6,147,985 A | * | 11/2000 | Bar-David et al. .......... 370/347 |
| 6,446,008 B1 | * | 9/2002 | Ozbek ......................... 702/17 |

* cited by examiner

Primary Examiner—Dao Phan
(74) Attorney, Agent, or Firm—Leonard A. Alkov; Glenn H. Lenzen, Jr.

(57) ABSTRACT

A system and method for forming a beam and creating nulls. The inventive method combines frequency domain suppression technology for narrow-band jammer rejection with orthogonal weighting using Eigen analysis for jammer nulling and signal beam-forming for an array antenna system. The inventive system is adapted for use with an adaptive array antenna having a plurality of radiating elements. The system includes a frequency domain suppressor connected to the array antenna and an orthogonal weighting subsystem connected to the frequency domain suppressor. In the illustrative implementation, signals received by each radiating elements are processed by an analog front-end and digitized. The frequency domain suppressor includes a Fast Fourier transformer (FFT) and a frequency domain suppressor for each element in the array. The frequency domain suppressor further includes a threshold evaluator which reads the signals output by the FFT's and provides threshold controls to the spectral suppressors. The orthogonal subsystem includes an adaptive weighting unit connected to the output of each of the spectral suppressors. The orthogonal weighting subsystem further includes an orthogonal weighting estimator for determining and optimal orthogonal Eigen-weighting to be applied to each of the adaptive weighting units. The outputs of each of the adaptive weighting processors are combined and inverse Fast Fourier transformed to provide one or more output beams and or one or more nulls in an efficient manner designed to leave the system with at least one degree of freedom for other functions.

24 Claims, 3 Drawing Sheets

SYSTEM AND METHOD FOR FORMING A BEAM AND CREATING NULLS WITH AN ADAPTIVE ARRAY ANTENNA USING ANTENNA EXCISION AND ORTHOGONAL EIGEN-WEIGHTING

BACKGROUND OF THE INVENTION

1. Field of the Invention

The present invention relates to antennas. More specifically, the present invention relates to system and methods for forming beams and creating nulls using phased array antennas.

2. Description of the Related Art

Adaptive antenna systems have been developed to perform beam forming or spatial nulling. With knowledge of the direction of the signal source, conventional antenna beam forming techniques endeavor to maximize the signal to noise ratio with respect to signals sent to or received from desired sources and attempt to steer nulls in the direction of undesirable sources.

Unfortunately, in many cases it may be difficult to ascertain the direction of the signal source with sufficient accuracy. This is particularly problematic with respect to spread spectrum and other signals having a signal strength below the noise level.

Conventional beam forming techniques require knowledge of the direction of the signal sources and a method to track the angle of arrival of the signal on a moving platform. Two methods are generally employed to acquire knowledge of the direction of the signal source of interest: angle of arrival approaches and adaptive searching for the signal direction.

In the angle arrival approach, a receiver estimates the angle arrival of the desired signal and performs adaptive signal processing to maximize the gain of the beam in the pointing direction. With this approach, assumptions must be made with respect to the relative location of the signal source. However, for many applications, an assumption with respect to the location of the signal source may introduce an unacceptable amount of error into the process.

On a moving platform, an initial measurement unit (IMU) is required to maintain the desired pointing direction. This solution can be expensive and potentially require an IMU of considerable size and weight.

Further, in a dynamic environment, the signal sources may move around requiring a communication of a large amount of data from one platform to another. Hence, angle of arrival approaches tend to be expensive, cumbersome and prone to error.

In electronic warfare applications, adaptive searching is often used to identify the location of a source of a jamming signal. The searching is typically performed by sweeping a radar receiver in azimuth and/or elevation. Unfortunately, the efficacy of this approach is limited in situations where the jamming source is intermittently activated.

Hence, a need existed in the art for a more effective, less-expensive system or method for ascertaining the direction of a signal source relative to conventional approaches. The need was addressed by the teachings of U.S. patent application Ser. No. 09/891,686, entitled SYSTEM AND METHOD FOR FORMING A BEAM AND CREATING NULLS WITH AN ADAPTIVE ARRAY ANTENNA USING ORTHOGONAL EIGEN-WEIGHTING filed Jun. 26, 2001 by K. V. Cai, the teachings of which are incorporated herein by reference.

Unfortunately, as is well-known in the art, the capacity of an array is dictated by the number of antenna elements thereof. For example, an antenna with four radiating elements, has three degrees of freedom. That is, the antenna has the capability of forming three beams or two beams and one null or one beam and two nulls or three nulls. In general, a phased array antenna has a degree of freedom equal to the number of radiating elements minus one. When the degrees of freedom of an antenna are dedicated to interference cancellation, the antenna has no remaining capability to perform other functions. Hence, in environments with many jammers, the antenna may be preoccupied with interference cancellation.

U.S. Pat. No. 5,271,038, issued Dec. 14, 1993, to K. V. Cai and entitled DISTORTION SUPPRESSION USING THRESHOLDING TECHNIQUES, the teachings of which are hereby incorporated herein by reference, discloses and claims a method for detecting a interferer using excision in the spectral domain. However, this technique is directed primarily to the elimination of the signal from a narrowband interferer. Inasmuch as many interferers may be wideband interferers, operating over a broad frequency range, this technique alone may be inadequate for many applications.

Hence, a need remains in the art for a system and method for eliminating narrow and wideband interferers while leaving the antenna with at least one degree of freedom to perform other functions.

SUMMARY OF THE INVENTION

The need in the art is addressed by the system and method for forming a beam and creating nulls of the present invention. The inventive method combines frequency domain suppression technology for narrow-band jammer rejection with orthogonal weighting using Eigen analysis for jammer nulling and signal beam-forming for an array antenna system. The inventive system is adapted for use with an adaptive array antenna having a plurality of radiating elements. The system includes a frequency domain suppressor connected to the array antenna and an orthogonal weighting subsystem.

In the illustrative implementation, signals received by each radiating elements are processed by an analog front-end and digitized. The frequency domain suppressor includes a Fast Fourier transformer (FFT) and a frequency domain suppressor for each element in the array. The frequency domain suppressor further includes a threshold evaluator which reads the signals output by the FFT's and provides threshold controls to the spectral suppressors.

The orthogonal weighting subsystem includes an adaptive weighting unit connected to the output of each of the spectral suppressors. The orthogonal weighting subsystem further includes an estimator for determining and optimal orthogonal Eigen-weighting to be applied to each of the adaptive weighting units. The outputs of each of the adaptive weighting processors are combined and inverse Fast Fourier transformed to provide one or more output beams and or one or more nulls in an efficient manner designed to leave the system with at least one degree of freedom for other functions.

The invention combines narrowband interference suppression with adaptive antenna nulling to improve anti-jamming capability. It provides a systematic method to excise partial band jammers prior to antenna nulling to maintain high degree of freedom for antenna nulling. It provides a spectral nulling technique which is less sensitive to partial band jamming tactics (i.e., rapid change in amplitude, frequency) that may cause degradation with conventional adaptive nulling techniques. The inventive technique can also be used to sort different emitters in frequency, amplitude and angle arrival (AOA), and can be used to characterize signals. And the inventive technique provides signal isolation from interference in spatial domain to support the Multiple Access capability (i.e., Spatial Domain Multiple Access or SDMA).

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
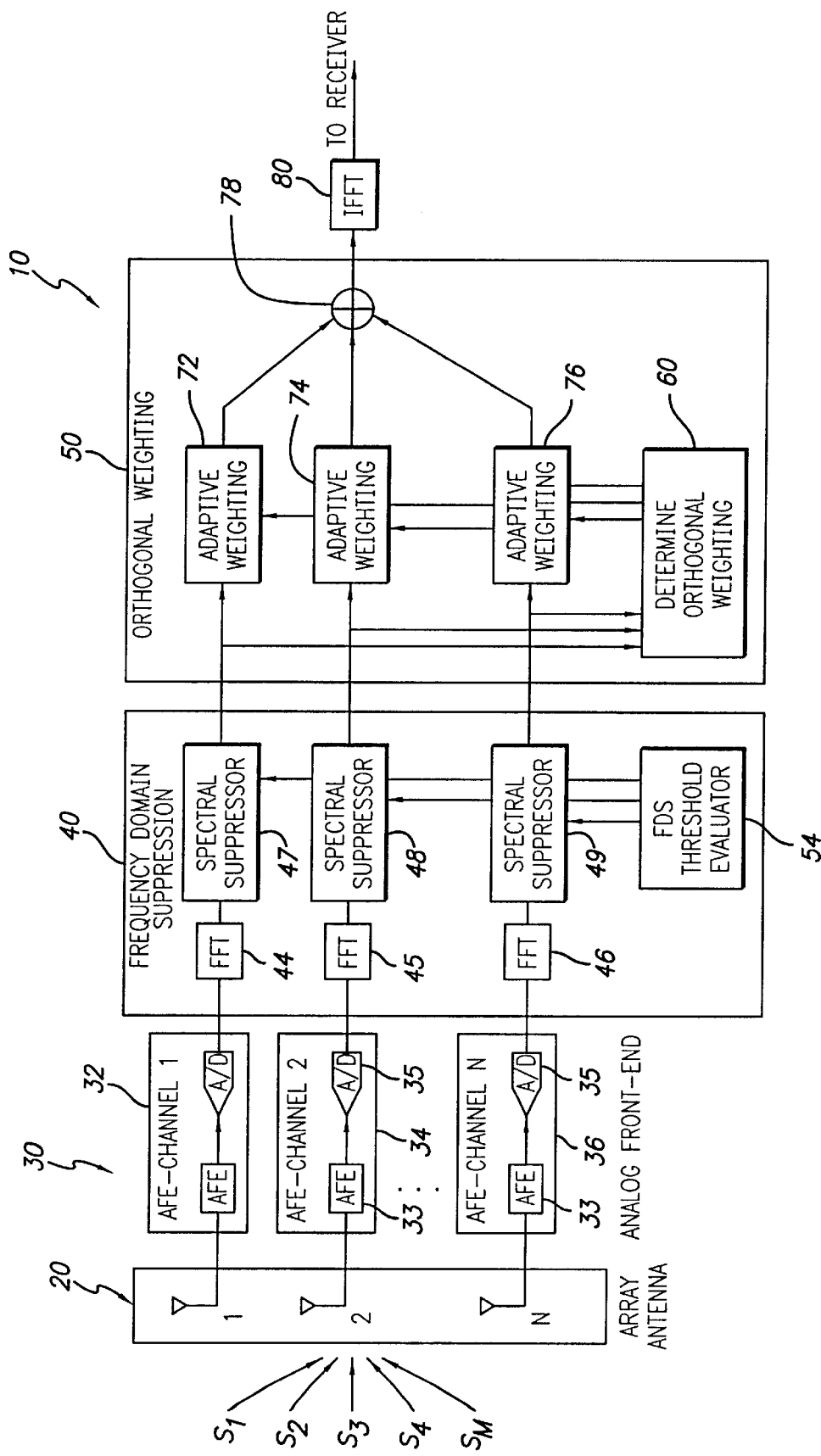
FIG. 1 is a block diagram showing an illustrative implementation of a system for forming a beam and creating nulls using antenna excision and orthogonal Eigen-weighting in accordance with the teachings of the present invention.

FIG. 1 is a block diagram showing an illustrative implementation of a system for forming a beam and creating nulls using antenna excision and orthogonal Eigen-weighting in accordance with the teachings of the present invention. The system 10 consists of four components: an array antenna 20, an analog front-end (AFE) 30 with N channels 32, 34, ... 36, a frequency domain suppressor 40, an orthogonal weighting subsystem 50, and an inverse Fast Fourier Transformer 80.

The antenna 20 is a phased array antenna of conventional design and construction with N radiating elements 1, 2, ... N. That is, the array antenna 20 has N elements with similar gain patterns. If the antenna elements have good amplitude phase matching, the antenna nulling process described more fully herein can be performed over the signal bandwidth. If the antenna elements do not have good amplitude phase matching, the nulling process described herein can be performed on individual Fast Fourier transformer (FFT) bins.

As illustrated in FIG. 1, N separate AFE channels 32, 34, ... 36, are included in the system 10, each consisting of a radio frequency to intermediate frequency (RF/IF) receiver 33 to convert the RF signal to baseband. The analog baseband signal is then digitized with a high performance analog to digital converter (A/D) 35 having sufficient dynamic range to handle large interference to signal level signals.

In the preferred embodiment, the frequency domain suppression unit 40 is implemented in accordance with the teachings of U.S. Pat. No. 5,271,038 entitled DISTORTION SUPPRESSION IN USING THRESHOLDING TECHNIQUES, issued Dec. 14, 1993, K. V. Cai, the teachings of which are hereby incorporated herein by reference.

Figure 2:
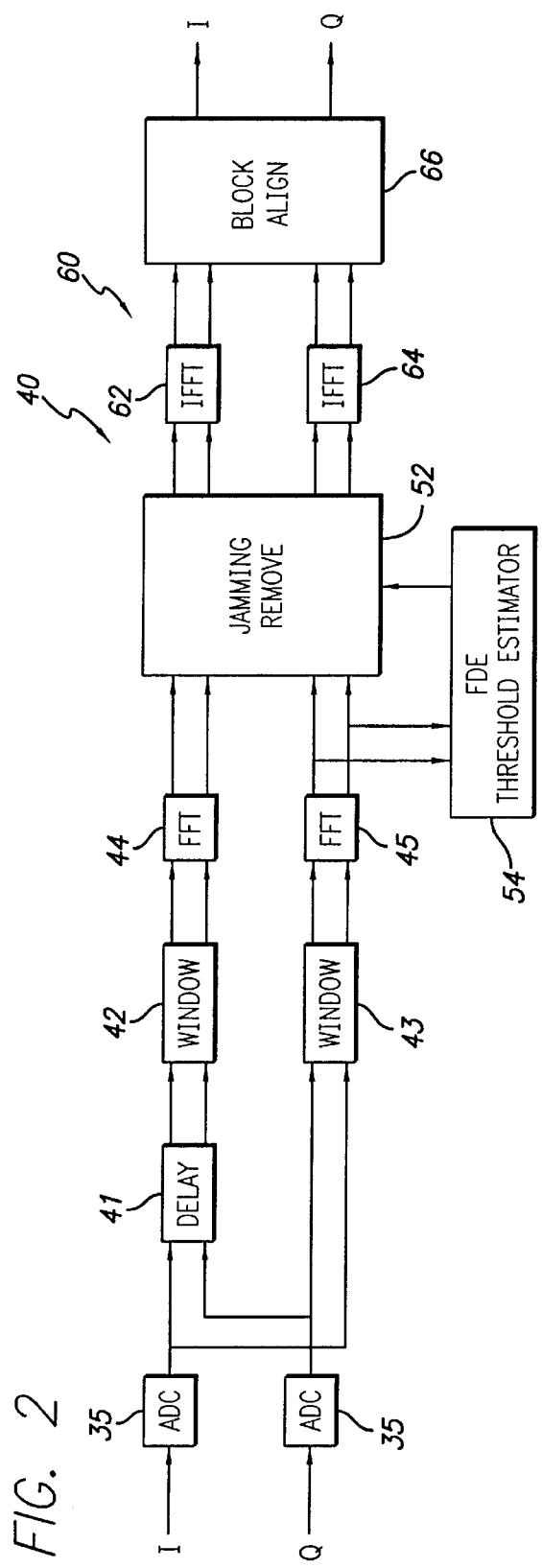
FIG. 2 is a block diagram showing an illustrative implementation of a preferred embodiment of a frequency domain suppression unit adapted for use with the system for forming a beam and creating nulls using antenna excision and orthogonal Eigen-weighting in accordance with the teachings of the present invention.

FIG. 2 is a block diagram showing an illustrative implementation of a preferred embodiment of a frequency domain suppression unit adapted for use with the system for forming a beam and creating nulls using antenna excision and orthogonal Eigen-weighting in accordance with the teachings of the present invention. The I and Q digital samples from the A/D 35 are converted into spectral samples using 50% overlapping window 42 and the FFTs 44, 45, etc. Note that the in-phase path I has a delay element 41. For both the direct path Q and the delay path I, N samples (of I and Q) are windowed, and N point FFT is processed to convert the I & Q samples into spectral samples.

The FFT samples on one channel, in this case, the Q channel, are used to estimate the threshold for frequency domain suppression (FDS) excision. The threshold is then fed to the spectral suppressors, shown generally as a jamming remove element 52, to remove the interference bins, i.e., bins with interfering signals. The excision threshold estimator and the excision process are explained more fully below.

Interference Suppression

In the illustrative embodiment, two thresholds are used to suppress the interference bin: 1) a clipping threshold $Thr_1$ and 2) a removal threshold $Thr_2$. The suppression rule is as follows:

If $|s(k)| < Thr_2$ then $s(k) = 0$ [1]

If $Thr_1 < |s(k)| < Thr_2$ then $s(k) = Thr_1 \cdot \left(\frac{s(k)}{|s(k)|}\right)$ [2]

If $|s(k)| < Thr_1$ then $s(k) = s(k)$ [3]

where s(k) is the FFT output samples, k=1,n

Suppression Threshold Estimator

In order to maximize the receiver performance the thresholds must be chosen properly. The invention technique presented herein searches for the threshold that would yield a maximum signal to noise ratio. The signal to noise ratio is expressed as:

$$(E/N_o)_{out} = m^2/\sigma^2$$ [4]

where m and σ are the mean and standard deviation of the signal, respectively. Let L and M be the index of the two threshold in the sorted spectrum profile (i.e., $Thr_1=S[L]$ and $Thr_2=S[M]$), the signal to noise ratio is expressed as:

$$m = \left[\frac{L}{n} + \frac{1}{2n}S[L]\left\{\sum_{i=L+1}^{M} S[i]^{-1}\right\}\right]\sqrt{E}$$

-continued $$\sigma^2 = \frac{1}{n}\sum_{i=1}^{L} s[i]^2 + \frac{M-L}{n}S[L]^2$$

$$\left(\frac{E}{N_o}\right)_{out} = \frac{m^2}{\sigma^2} = \frac{\left[\frac{L}{n} + \frac{1}{2n}S[L]\left\{\sum_{i=L+1}^{M} S[i]^{-1}\right\}\right]^2}{\frac{1}{n}\sum_{i=1}^{L} S[i]^2 + \frac{M-L}{n}S[L]^2} E = \Gamma(SY(i), L, M)E$$

$$\Gamma(SY(i), L, M) = \frac{\left[\frac{L}{n} + \frac{1}{2n}S[L]\{F(M) - F(L)\}\right]^2}{\frac{1}{n}G(L) + \frac{M-L}{n}S[L]^2}$$

$$F(k) = \sum_{i=1}^{k} S[i]^{-1}$$

$$G(k) = \sum_{i=1}^{k} S[i]^2$$

where E is the energy of the signal within a FFT frame. Thus the signal to noise ratio is a function of the sorted spectrum profile. The objective of the Suppression Threshold Estimator is to search for L and M that maximizes $\Gamma$.

In practice, it has been shown that the two thresholds $Thr_1$ and $Thr_2$ are very close for most practical cases. In this situation we have L=M, $$\Gamma(SY(i), M, M) = \frac{M^2}{nG(M)}$$

Thus the searching for the optimum M is rather simple since it requires single dimension search of M, instead of two dimensions for M and N.

In summary, the optimum threshold estimation sequence is as follows:
1. The amplitude of the spectral samples are computed
2. The spectral amplitude are averaged over K frames
3. The average spectral amplitude (N samples) are sorted to produce the sequence S[k]
4. Compute the gain function $\Gamma$
5. For M=1 to n, search for the maximum $\Gamma$. The threshold is $Thr_1=Thr_2=S[M]$.

Figure 3A:
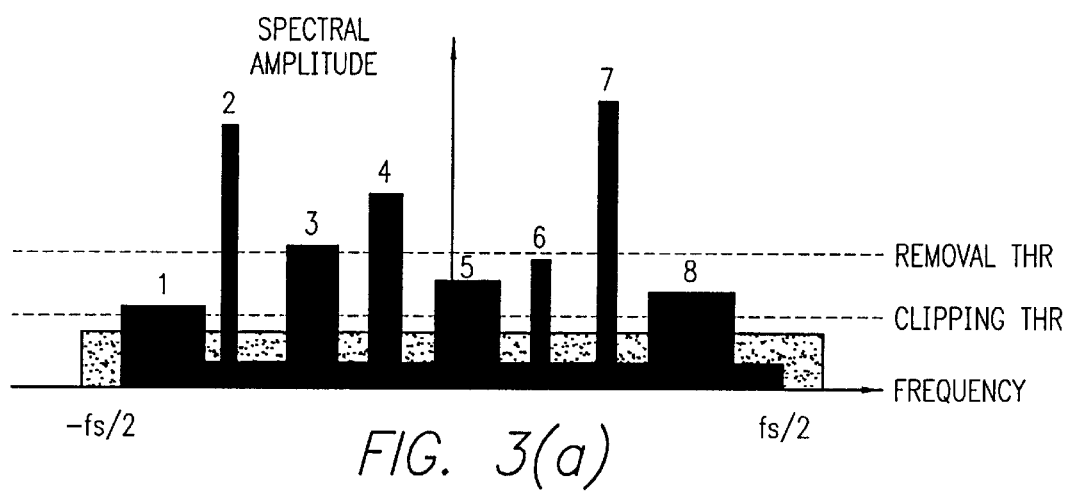
FIG. 3(a) is a top view showing the signal band with several interference signals.
Figure 3B:
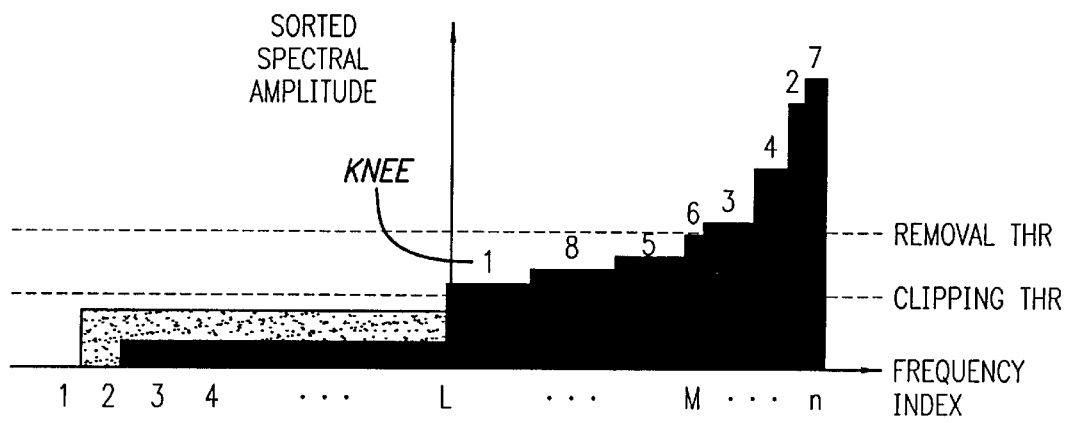
FIG. 3(b) is a bottom view showing the same signals after sorting.

FIGS. 3(a) and (b) are graphs which illustrate the method for sorting narrow-band interference signals in accordance with the present teachings. FIG. 3(a) is a top view showing the signal band with several interference signals. FIG. 3(b) is a bottom view showing the same signals after sorting. Sorting separates noise and jammers into two parts and thus provides an easy excision of the unwanted signals starting at the "knee". The flat floor indicates the noise level, and the slope indicates the interference signal.

As taught by the above-referenced Cai patent, Frequency Domain Suppression (FDS) can potentially suppress a large number of narrowband and partial band jammers. This process removes spectral samples with large amplitudes, eliminates partial-band jammers, and thus suppresses a large class of jammers such as
   CW jammers
   Narrowband jammers
   Partial band jammers Antenna Orthogonal Weighting Returning to FIG. 1, in the preferred embodiment, the orthogonal weighting subsystem 50, is implemented in accordance with the teachings of copending U.S. patent application Ser. No. 09/891,686, filed Jun. 26, 2001 by K. V. Cai and entitled SYSTEM AND METHOD FOR FORMING A BEAM AND CREATING NULLS WITH AN ADAPTIVE ARRAY ANTENNA USING ORTHOGONAL EIGEN-WEIGHTING the teachings of which are incorporated by reference herein.

The objective of the subsystem 50 is to maximize the gain at the signal of interest and apply nulling on all interference signals. The Antenna Orthogonal Weighting is also similar to the conventional array processing but the weightings are performed on the spectral samples. After the partial band interference samples are excised by the frequency domain suppressor 40, the samples are processed to compute Eigen parameters by the orthogonal weighting subsystem 50.

As illustrated FIG. 1, the orthogonal weighting subsystem 50 includes and orthogonal weighting estimator 60 which determines orthogonal weights for an adaptive weighting unit 72, 74, . . . 76 for each associated channel.

Figure 4:
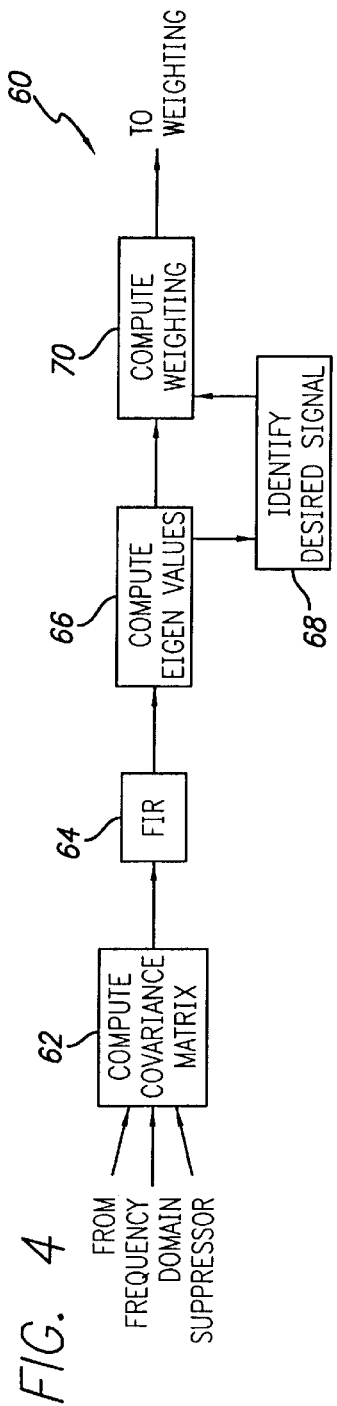
FIG. 4 is an operational flow diagram of an orthogonal weighting estimator implemented in accordance with the teachings of a Cai patent application.

FIG. 4 is an operational flow diagram of an orthogonal weighting estimator implemented in accordance with the teachings of the above-referenced Cai patent application. The estimator 60 first computes the covariance matrix (step 62), and then evaluates its eigenvalues (step 66). The elements of the covariance matrix are computed by integrating the excision-processed FFT samples over the FFT frame. The output is then filtered using a finite impulse response (FIR) filter (step 64) to improve the signal to noise ratio thereof. This process allows updates of the covariance matrix at the FFT rate, while the estimation of the eigenvalues can be performed at a programmable rate. Therefore, the eigenvalue computation, signal identification and orthogonal weighting can be performed by a digital signal processor (DSP) at a low sampling rate.

Covariance Matrix Evaluation

Assuming the antenna has M antenna elements, the computation of the covariance matrix R, where R is given by:

$$R = \begin{pmatrix} R_{11} & R_{12} & R_{1M} \\ R_{21} & R_{22} & R_{2M} \\ \cdots & \cdots & \cdots \\ R_{M1} & R_{M2} & R_{MM} \end{pmatrix}$$

begins with the computation of:

$$R_{mn} = E\{r_m(t)r_n^*(t)\} = E\left\{\sum_{l=1}^{l}\sum_{i=1}^{l} s_1(t)s_i^*(t)\exp\{j(\theta_{1m} - \theta_{in})\}\right\}$$

where:

$$r_m(t) = \sum_{i=1}^{l} s_i(t)\exp\{j(\omega_i t + \theta_{im})\}$$

$r_m(t)$ and $r_n(t)$ are the received signal at the antenna m and n, $s_1(t)$ and $s_i(t)$ are the signal sources, $\omega_i$ is the signal frequency and $\theta_{im}$ is the phase of the $i^{th}$ signal arriving at $m^{th}$ antenna element. Also, 1 is the total number of signals.

Compute the Eigenvalues and Eigenvectors

As discussed more fully in the above referenced Cai application, MB covariance matrix can be decomposed into:

$$R = W\Sigma W'$$

where $\Sigma$ is the eigenvalue matrix (diagonal matrix with eigenvalues), and W is the eigenvector matrix (columns are eigenvectors corresponding to eigenvalues):

$$\Sigma = \begin{pmatrix} \lambda_1 & 0 & 0 \\ 0 & \lambda_2 & 0 \\ \cdots & \cdots & \cdots \\ 0 & 0 & \lambda_M \end{pmatrix}$$

$$W = \begin{pmatrix} V_{11} & V_{12} & V_{1M} \\ V_{21} & V_{22} & V_{2M} \\ \cdots & \cdots & \cdots \\ V_{M1} & V_{M2} & V_{MM} \end{pmatrix}$$

At step 68, $S_k$ is identified as the $k^{th}$ strongest signal, and $\lambda_k$ is identified as the $k^{th}$ largest eigenvalue as discussed more fully below. The eigenvectors are orthogonal. Consequently, when $\lambda_k$ is used as the weighting (step 70), then the system 10 (FIG. 1) forms a beam in response to the signal $S_k$ and at the same time form nulls in response to the signals stronger than $S_k$. These stronger signals are the interference signals.

Weighting Computation

Hence, once the eigenvectors corresponding to the interferers are determined, the eigenvectors is used as the weighting and applied to the adaptive weighting units 72, 74, ... and 76 of FIG. 1. The output of the combiner 78 is expressed as:

$$z = w'_n \begin{pmatrix} r_1(t) \\ r_2(t) \\ \cdots \\ r_M(t) \end{pmatrix}$$

where $W_n$ is the normalized weighting to maintain noise at a constant level.

$$w_n = \frac{w}{|w|} = \frac{(1 y_2 y_3 y_M)}{\sqrt{1^2 + |y_2|^2 + |y_3|^2 + |y_M|^2}}$$

Desired Signal Identification (for S/N>0)

Figure 5:
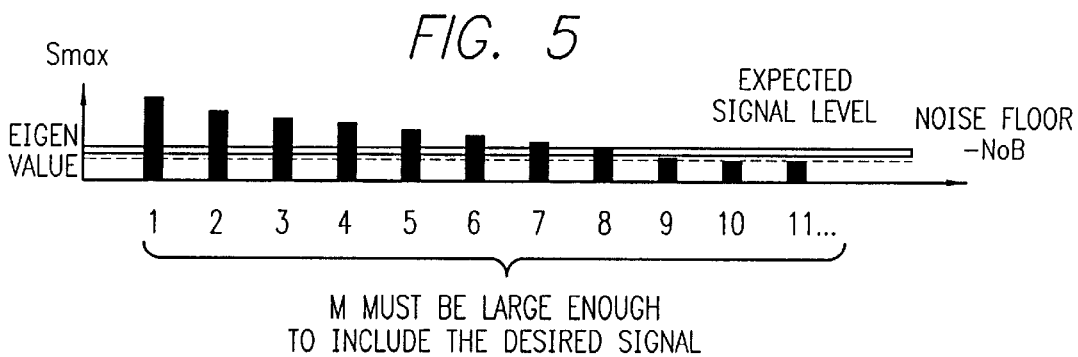
FIG. 5 shows an illustrative distribution of the eigenvalues computed in accordance with the method of the present invention.

The objective of this function is to identify which signal is the desired signal and which signals are the interference signals. Three characteristics of the eigen parameters are as follows:

The eigenvalues are "proportional" to the signal amplitudes. This is generally accurate up to 3 dB. Higher error can occur if S/N is low, or when the desired signal and a interference have similar amplitudes FIG. 5 shows an illustrative distribution of the eigenvalues computed in accordance with the method of the present invention. The larger eigenvalues correspond to the stronger signal and the smaller eigenvalues correspond to the weaker signal.

The eigenvectors are the pointing vectors of the signal (whose amplitude corresponds to the eigenvalues). These parameters can be used to identify the angles of arrival of the signals.

In addition, the weighted signal (weight with $V_k$, for k=1 to M) can be passed through a baud rate detector to detect the baud rate $R_{bk}$. This baud rate can be used to help identifying the desired signal. Table 1 shows an illustrative decision space for a search for the desired signal.

TABLE 1

| Parameters | Desired Signal | Signal #1 | Signal #2 | Signal #k | Signal #M |
|---|---|---|---|---|---|
| Amplitude | $A_d$ | $A_1 = f(\lambda_1)$ | $A_1 = f(\lambda_2)$ | $A_k = f(\lambda_k)$ | $A_M = f(\lambda_M)$ |
| AOA | $AOA_d$ | $AOA = g(V_1)$ | $AOA_2 = g(V_2)$ | $AOA_k = g(V_k)$ | $AOA_M = g(V_M)$ |
| Baud Rate | $R_{bd}$ | $R_{b1}$ | $R_{b2}$ | $R_{bk}$ | $R_{bM}$ |

The total error can be computed as follows:

$$D_i = \alpha \cdot |A_i - A_d| + \beta \cdot |AOA_k - AOA_d| + \gamma \cdot |R_{bk} - R_{bd}|$$

where $\alpha$, $\beta$, $\gamma$ are the some parameters that weight the matching parameters. Thus the desired signal can be identify by searching for the minimum Di.

This technique works well for signals with good signal to noise ratios (S/N). When $V_k$ is used as weighting, the system 10 forms a beam at the desired signal and nulls at stronger interference signals.

Desired Signal Identification (for S/N<0)

For spread spectrum signals where the desired signal is below the noise, the eigenvalues and eigenvectors will not necessarily correspond to the desired signal. In this situation, it will be difficult to form a beam in the direction of the desired signal. However, by picking the eigenvalue corresponding to the noise level (for example $\lambda 9$ in FIG. 5) the strong signals can be nulled. This would suppress the stronger interference signals.

Thus, the present invention has been described herein with reference to a particular embodiment for a particular application. Those having ordinary skill in the art and access to the present teachings will recognize additional modifications, applications and embodiments within the scope thereof. For example, a principal application for the present teachings is for antenna signal excision, beam forming, and jammer nulling. However, the invention is not limited thereto.

The inventive technique can be used to separate, sort and identify the characteristics of the signals. As each eigenvector is applied as the weighting, the M combiner outputs will yield the received signal corresponding to the M strongest signals, free of interference from other signal. This process identifies the signal power, and direction of arrival. Furthermore, since each signal is free from interference, the signal can then be processed further to identify the remaining characteristics such as modulation, baud rate, etc.

As discussed in the above paragraph, each eigenvector identifies the direction of the signal source. The inventive technique can be used to ascertain jammer location or target signal location in a cluttered or multi-path environment, e.g., battlefield environment.

The inventive excision technique should efficiently remove interference and narrow-band jammers prior to nulling the signals. The excision technique of the present invention should not be sensitive to interference amplitude or frequency. The inventive technique should suppress interferers without requiring use of adaptive processing techniques that are sensitive to jammer countermeasures (i.e., amplitude modulation or blinking, chirping). Since excision occurs prior to nulling/beam-forming, maximum degrees of freedom should be available to the nuller without limitation to narrow-band signals. The inventive technique is not limited to a particular location of the antenna array 20, its arrangement, or its pointing angle. The inventive technique is not limited to a direction of incoming signal, which may be distorted by multipath reflections. No geometry solution is needed. In accordance with the present teachings, the cancelation factor is squarely proportional to the interference power, thus removing strong interferers. That is, the inventive system and method should remove the strongest interferers. Strong jammers should be nulled up to the "degrees of freedom" (# ant. Elements-1) without degradation of performance (i.e. null depth for each jammer remains the same independent of the number of jammers). The present invention provides signal isolation from interference in spatial domain to support the Multiple Access capability (i.e., Spatial Domain Multiple Access or SDMA). With M antenna elements, the technique can sort out M largest signals. The inventive technique can be used for CDMA where Eigenvalue is set to noise level thus null strong interferers. The inventive technique does not require a IMU to operate in a moving platform. The inventive technique can be adapted to allow dynamic tracking.

Further, depending on the application, the Orthogonal Weighting Processing can be processed before the Frequency Domain Suppression. This will allow the receiver to beam-forms on the desired signal and nulls the interference signals before process the spectral nulling. However, in this situation, the strongest interferers are suppressed before the spectral nulling, and thus the system may or may not be optimum.

It is therefore intended by the appended claims to cover any and all such applications, modifications and embodiments within the scope of the present invention.

Accordingly,

What is claimed is:

1. A system for use with an array antenna having a plurality of radiating elements, said system comprising:
   a frequency domain suppressor connected to said array antenna and
   an orthogonal weighting subsystem connected to said frequency domain suppressor.

2. The invention of claim 1 further including an analog front-end circuit connected to each of said radiating elements.

3. The invention of claim 2 further including an analog to digital converter connected to each of said analog front-end circuits.

4. The invention of claim 3 wherein said frequency domain suppressor includes a Fourier transformer connected to the output of each analog to digital converter.

5. The invention of claim 4 wherein said Fourier transformer is a Fast Fourier transformer.

6. The invention of claim 5 wherein said frequency domain suppressor includes a spectral suppressor connected to the output of each of said Fast Fourier transformers.

7. The invention of claim 6 wherein said frequency domain suppressor includes a threshold evaluator connected to the output of at least one of said Fast Fourier transformers and said threshold evaluator being connected to at least one of said spectral suppressors.

8. The invention of claim 7 wherein said orthogonal subsystem includes and adaptive weighting unit connected to the output of each of said spectral suppressors.

9. The invention of claim 8 wherein said orthogonal weighting subsystem includes an orthogonal weighting estimator for determining orthogonal weighting to be applied to each of said adaptive weighting units.

10. The invention of claim 9 further including a combiner connected to the outputs of said orthogonal weighting units.

11. The invention of claim 10 further including an Inverse Fast Fourier transformer connected to the output of said combiner.

12. An antenna system comprising:
    an array antenna having a plurality of radiating elements;
    means for digitizing a signal output by each of said radiating elements;
    means for effecting frequency domain suppression of said digitized signals and
    means for effecting orthogonal weighting estimation of said frequency domain suppressed signals.

13. The invention of claim 12 further including an analog front-end circuit connected to each of said radiating elements.

14. The invention of claim 13 wherein said means for digitizing includes an analog to digital converter connected to each of said analog front-end circuits.

15. The invention of claim 14 wherein said means for effecting frequency domain suppression includes a Fourier transformer connected to the output of each analog to digital converter.

16. The invention of claim 15 wherein said Fourier transformer is a Fast Fourier transformer.

17. The invention of claim 16 wherein said means for effecting frequency domain suppression includes a spectral suppressor connected to the output of each of said Fast Fourier transformers.

18. The invention of claim 17 wherein said means for effecting frequency domain suppression includes a threshold evaluator connected to the output of at least one of said Fast Fourier transformers and said threshold evaluator being connected to at least one of said spectral suppressors.

19. The invention of claim 18 wherein said means for effecting orthogonal weighting estimation includes and adaptive weighting unit connected to the output of each of said spectral suppressors.

20. The invention of claim 19 wherein said means for effecting orthogonal weighting estimation includes means for determining orthogonal weighting to be applied to each of said adaptive weighting units.

21. The invention of claim 20 further including a combiner connected to the outputs of said orthogonal weighting units.

22. The invention of claim 21 further including an Inverse Fast Fourier transformer connected to the output of said combiner.

23. A method for use with an array antenna having a plurality of radiating elements, said method including the steps of:
    providing frequency domain suppression in connection with said array antenna and
    providing orthogonal weighting estimation after providing frequency domain suppression.

24. A method for use with an array antenna having a plurality of radiating elements, said method including the steps of:
    providing orthogonal weighting estimation and
    providing frequency domain suppression in connection with said array antenna after orthogonal weighting estimation.

* * * * *